(12) United States Patent
Aisenbrey

(10) Patent No.: US 7,644,495 B2
(45) Date of Patent: Jan. 12, 2010

(54) METHOD OF FORMING A CONDUCTIVE DEVICE USING CONDUCTIVE RESIN-BASE MATERIALS

(75) Inventor: Thomas Aisenbrey, Littleton, CO (US)

(73) Assignee: Integral Technologies, Inc., Bellingham, WA (US)

( * ) Notice: Subject to any disclaimer, the term of this patent is extended or adjusted under 35 U.S.C. 154(b) by 265 days.

(21) Appl. No.: 11/800,131

(22) Filed: May 4, 2007

(65) Prior Publication Data

US 2007/0204459 A1   Sep. 6, 2007

Related U.S. Application Data

(60) Division of application No. 10/933,064, filed on Sep. 2, 2004, now abandoned, and a continuation-in-part of application No. 10/309,429, filed on Dec. 4, 2002, now Pat. No. 6,870,516, which is a continuation-in-part of application No. 10/075,778, filed on Feb. 14, 2002, now Pat. No. 6,741,221.

(60) Provisional application No. 60/499,452, filed on Sep. 2, 2003, provisional application No. 60/317,808, filed on Sep. 7, 2001, provisional application No. 60/269,414, filed on Feb. 16, 2001, provisional application No. 60/268,822, filed on Feb. 15, 2001.

(51) Int. Cl.
  *H01R 9/00* (2006.01)
(52) U.S. Cl. .............................. 29/843; 29/842; 29/844; 29/845
(58) Field of Classification Search ............ 29/842–845

See application file for complete search history.

(56) References Cited

U.S. PATENT DOCUMENTS

| | | | | | |
|---|---|---|---|---|---|
| 3,919,122 | A | * | 11/1975 | Tigner | 252/512 |
| 3,978,378 | A | * | 8/1976 | Tigner et al. | 361/323 |
| 4,764,327 | A | * | 8/1988 | Nozaki et al. | 264/225 |
| 4,834,835 | A | * | 5/1989 | Cziep et al. | 216/7 |
| 5,111,363 | A | * | 5/1992 | Yagi et al. | 361/751 |
| 6,020,049 | A | * | 2/2000 | Cucinotta | 428/209 |
| 6,342,680 | B1 | * | 1/2002 | Nakagawa et al. | 174/257 |
| 6,589,459 | B2 | * | 7/2003 | Nakagawa et al. | 264/104 |
| 6,818,939 | B1 | * | 11/2004 | Hadizad | 257/302 |
| 2004/0048050 | A1 | * | 3/2004 | Cassat et al. | 428/209 |

* cited by examiner

*Primary Examiner*—C. J Arbes
(74) *Attorney, Agent, or Firm*—Douglas R. Schnabel

(57) ABSTRACT

Electrical interfaces formed into a conductive loaded resin-based material. The conductive loaded resin-based material comprises micron conductive powder(s), conductive fiber(s), or a combination of conductive powder and conductive fibers in a base resin host. The percentage by weight of the conductive powder(s), conductive fiber(s), or a combination thereof is between about 20% and 50% of the weight of the conductive loaded resin-based material. The micron conductive powders are formed from non-metals, such as carbon, graphite, that may also be metallic plated, or the like, or from metals such as stainless steel, nickel, copper, silver, that may also be metallic plated, or the like, or from a combination of non-metal, plated, or in combination with, metal powders. The micron conductor fibers preferably are of nickel plated carbon fiber, stainless steel fiber, copper fiber, silver fiber, or the like.

10 Claims, 10 Drawing Sheets

METHOD OF FORMING A CONDUCTIVE DEVICE USING CONDUCTIVE RESIN-BASE MATERIALS

This is a division of patent application Ser. No. 10/933,064, filed on Sep. 2, 2004, now abandoned and assigned to the same assignee as the present invention. This divisional patent application claims priority to the U.S. Provisional Patent Application No. 60/499,452 filed on Sep. 2, 2003, which is herein incorporated by reference in its entirety.

This patent application is a Continuation-in-Part of INT01-002CIP, filed as U.S. patent application Ser. No. 10/309,429, filed on Dec. 4, 2002, now issued as U.S. Pat. No. 6,870,516, also incorporated by reference in its entirety, which is a Continuation-in-Part application, filed as U.S. patent application Ser. No. 10/075,778, filed on Feb. 14, 2002, now issued as U.S. Pat. No. 6,741,221, which claimed priority to U.S. Provisional Patent Applications Ser. No. 60/317,808, filed on Sep. 7, 2001, Ser. No. 60/269,414, filed on Feb. 16, 2001, and Ser. No. 60/268,822, filed on Feb. 15, 2001.

BACKGROUND OF THE INVENTION (1) Field of the Invention

This invention relates to conductive resin-based materials and, more particularly, to electrical interfaces to conductive loaded resin-based materials molded of conductive loaded resin-based materials comprising micron conductive powders, micron conductive fibers, or a combination thereof, homogenized within a base resin when molded. This manufacturing process yields a conductive part or material usable within the EMF or electronic spectrum(s).

(2) Description of the Prior Art

Conductive plastic materials have become popular in recent years as a means to combine useful plastics properties with some level of conductivity. Typically, these materials are very limited in use because conductivities are too low for most circuit applications. In addition, electrical interfaces to conductive plastics are difficult and expensive to form and result poor connectivity. In the present invention, a novel conductive loaded resin-based material having excellent conductivity and other properties is described. Achieving a very low resistance electrical interface to this conductive loaded resin-based material is a primary objective of the present invention.

Several prior art inventions relate to methods and structures for interfacing to conductive plastics. U.S. Patent Publication US 2003/0153223 A1 to Matsumoto et al teaches a connecting method for a metal material and an electric conductive plastic material. This invention teaches the process of heating the connecting portion of the electric conductive resin material to a temperature equal to or more that a softening point of the connecting portion and depressing the metal material to the heated portion. U.S. Patent Publications US 2002/0142676 A1, US 2002/0139580 A1, and US 2002/0139574 A1 to Hosaka et al teach an electric connector for twisted pair cable, an electric contact, and an electric connector comprising, in part, a lead-free, ultrahigh-conductive plastic. This plastic comprises a thermoplastic resin, a lead-free solder, and a metal powder that assists fine dispersion of the lead-free solder in the thermoplastic resin. This reference also teaches passing an electrical current through the connectors to melt the solder in the plastic in order to form the connection. U.S. Patent Publication US 2002/0005569 A1 to Kobayashi et al teaches the manufacture of a contact terminal element and a contact terminal device from a conductive resin.

SUMMARY OF THE INVENTION

A principal object of the present invention is to provide an effective electrical interface to conductive loaded resin-based material.

A further object of the present invention is to provide a method to form an electrical interface to conductive loaded resin-based material.

A yet further object of the present invention is to provide an electrical interface to conductive loaded resin-based material where the characteristics can be altered or the visual characteristics can be altered by forming a metal layer over the conductive loaded resin-based material.

A yet further object of the present invention is to provide methods to fabricate an electrical interface to conductive loaded resin-based material incorporating various forms of the material.

In accordance with the objects of this invention, a conductive device is achieved. The device comprises a conductive loaded, resin-based material comprising conductive materials in a base resin host. A metal terminal embedded in the conductive loaded, resin-based material.

Also in accordance with the objects of this invention, a conductive device is achieved. The device comprises a conductive loaded, resin-based material comprising conductive materials in a base resin host. A metal terminal embedded in the conductive loaded, resin-based material. The percent by weight of the conductive materials is between about 20% and about 50% of the total weight of the conductive loaded resin-based material.

Also in accordance with the objects of this invention, a method to form a conductive device is achieved. The method comprises providing a conductive loaded, resin-based material comprising conductive materials in a resin-based host. A metal terminal is provided. The metal terminal is molded into the conductive loaded resin-based material to complete the conductive device.

Also in accordance with the objects of this invention, a method to form a conductive device is achieved. The method comprises molding a conductive loaded, resin-based material comprising conductive materials in a resin-based host. A metal terminal is provided. The metal terminal is embedded into the conductive loaded resin-based material to complete a conductive device.

BRIEF DESCRIPTION OF THE DRAWINGS

In the accompanying drawings forming a material part of this description, there is shown.

DESCRIPTION OF THE PREFERRED EMBODIMENTS

Figure 1:
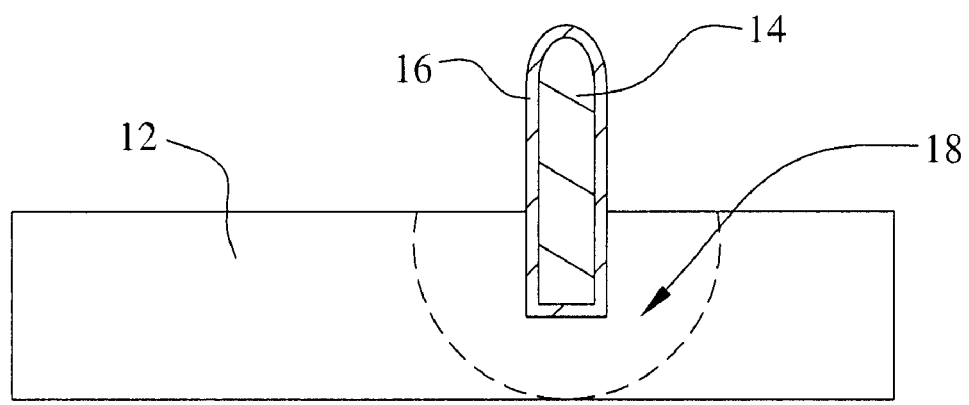
FIG. 1 illustrate a first preferred embodiment of the present invention showing an electrical interface to conductive loaded resin-based material.

This invention relates to devices molded of conductive loaded resin-based materials comprising micron conductive powders, micron conductive fibers, or a combination thereof, homogenized within a base resin when molded. More particularly, this invention relates to electrical interfaces to this conductive loaded resin-based material.

The conductive loaded resin-based materials of the invention are base resins loaded with conductive materials, which then makes any base resin a conductor rather than an insulator. The resins provide the structural integrity to the molded part. The micron conductive fibers, micron conductive powders, or a combination thereof, are homogenized within the resin during the molding process, providing the electrical continuity.

The conductive loaded resin-based materials can be molded, extruded or the like to provide almost any desired shape or size. The molded conductive loaded resin-based materials can also be cut, stamped, or vacuumed formed from an injection molded or extruded sheet or bar stock, over-molded, laminated, milled or the like to provide the desired shape and size. The thermal or electrical conductivity characteristics of devices fabricated using conductive loaded resin-based materials depend on the composition of the conductive loaded resin-based materials, of which the loading or doping parameters can be adjusted, to aid in achieving the desired structural, electrical or other physical characteristics of the material. The selected materials used to fabricate the devices are homogenized together using molding techniques and or methods such as injection molding, over-molding, insert molding, thermo-set, protrusion, extrusion or the like. Characteristics related to 2D, 3D, 4D, and 5D designs, molding and electrical characteristics, include the physical and electrical advantages that can be achieved during the molding process of the actual parts and the polymer physics associated within the conductive networks within the molded part(s) or formed material(s).

The use of conductive loaded resin-based materials in the fabrication of devices significantly lowers the cost of materials and the design and manufacturing processes used to hold ease of close tolerances, by forming these materials into desired shapes and sizes. The devices can be manufactured into infinite shapes and sizes using conventional forming methods such as injection molding, over-molding, or extrusion or the like. The conductive loaded resin-based materials, when molded, typically but not exclusively produce a desirable usable range of resistivity from between about 5 and 25 ohms per square, but other resistivities can be achieved by varying the doping parameters and/or resin selection(s).

The conductive loaded resin-based materials comprise micron conductive powders, micron conductive fibers, or any combination thereof, which are homogenized together within the base resin, during the molding process, yielding an easy to produce low cost, electrically conductive, close tolerance manufactured part or circuit. The micron conductive powders can be of carbons, graphites, amines or the like, and/or of metal powders such as nickel, copper, silver, or plated or the like. The use of carbons or other forms of powders such as graphite(s) etc. can create additional low level electron exchange and, when used in combination with micron conductive fibers, creates a micron filler element within the micron conductive network of fiber(s) producing further electrical conductivity as well as acting as a lubricant for the molding equipment. The micron conductive fibers can be nickel plated carbon fiber, stainless steel fiber, copper fiber, silver fiber, or the like, or combinations thereof. The structural material is a material such as any polymer resin. Structural material can be, here given as examples and not as an exhaustive list, polymer resins produced by GE PLASTICS, Pittsfield, Mass., a range of other plastics produced by GE PLASTICS, Pittsfield, Mass., a range of other plastics produced by other manufacturers, silicones produced by GE SILICONES, Waterford, N.Y., or other flexible resin-based rubber compounds produced by other manufacturers.

The resin-based structural material loaded with micron conductive powders, micron conductive fibers, or in combination thereof can be molded, using conventional molding methods such as injection molding or over-molding, or extrusion to create desired shapes and sizes. The molded conductive loaded resin-based materials can also be stamped, cut or milled as desired to form create the desired shape form factor(s) of the devices. The doping composition and directionality associated with the micron conductors within the loaded base resins can affect the electrical and structural characteristics of the devices, and can be precisely controlled by mold designs, gating and or protrusion design(s) and or during the molding process itself. In addition, the resin base can be selected to obtain the desired thermal characteristics such as very high melting point or specific thermal conductivity.

A resin-based sandwich laminate could also be fabricated with random or continuous webbed micron stainless steel fibers or other conductive fibers, forming a cloth like material. The webbed conductive fiber can be laminated or the like to materials such as Teflon, Polyesters, or any resin-based flexible or solid material(s), which when discretely designed in fiber content(s), orientation(s) and shape(s), will produce a very highly conductive flexible cloth-like material. Such a cloth-like material could also be used in forming devices that could be embedded in a person's clothing as well as other resin materials such as rubber(s) or plastic(s). When using conductive fibers as a webbed conductor as part of a laminate or cloth-like material, the fibers may have diameters of between about 3 and 12 microns, typically between about 8 and 12 microns or in the range of about 10 microns, with length(s) that can be seamless or overlapping.

The conductive loaded resin-based material of the present invention can be made resistant to corrosion and/or metal electrolysis by selecting micron conductive fiber and/or micron conductive powder and base resin that are resistant to corrosion and/or metal electrolysis. For example, if a corrosion/electrolysis resistant base resin is combined with stainless steel fiber and carbon fiber/powder, then a corrosion and/or metal electrolysis resistant conductive loaded resin-based material is achieved. Another additional and important feature of the present invention is that the conductive loaded resin-based material of the present invention may be made flame retardant. Selection of a flame-retardant (FR) base resin material allows the resulting product to exhibit flame retardant capability. This is especially important in applications as described herein.

The homogeneous mixing of micron conductive fiber and/or micron conductive powder and base resin described in the present invention may also be described as doping. That is, the homogeneous mixing converts the typically non-conductive base resin material into a conductive material. This process is analogous to the doping process whereby a semiconductor material, such as silicon, can be converted into a conductive material through the introduction of donor/acceptor ions as is well known in the art of semiconductor devices. Therefore, the present invention uses the term doping to mean converting a typically non-conductive base resin material into a conductive material through the homogeneous mixing of micron conductive fiber and/or micron conductive powder into a base resin.

As an additional and important feature of the present invention, the molded conductor loaded resin-based material exhibits excellent thermal dissipation characteristics. Therefore, devices manufactured from the molded conductor loaded resin-based material can provide added thermal dissipation capabilities to the application. For example, heat can be dissipated from electrical devices physically and/or electrically connected to devices of the present invention.

Referring now to FIG. 1, a first preferred embodiment of the present invention is illustrated. Several important features of the present invention are shown and discussed below. Referring now to FIG. 1, a device comprising the conductive loaded resin-based material 12 is shown in cross section. An electrical connection 14, terminal, or interface, is embedded into the conductive loaded resin-based material 12. The interface 14 facilitates an electrical and mechanical connection of the conductive loaded resin-based material 12 to an electrical circuit, not shown.

In particular, the terminal 10 comprises a metal pin 14, or shaft. In the preferred embodiment, the interface 10 comprises a metal, such as iron, that can be magnetized. As a further preferred embodiment, the conductive loading of the conductive loaded resin-based material 12 comprises a material that susceptible to a magnetic field. For example, stainless steel fiber and/or powder, is susceptible to physical orientation or movement under the influence of a magnetic field. As a further preferred embodiment of the present invention, the magnetized pin 14 generates a magnetic field that effects the orientation of the conductive loading fibers and/or powders in the resin-based material. In particular, during the molding phase, the molten base resin allows the conductive loading material to freely flow and orient such that an area 18 of higher concentration of fibers and or powders is formed near the magnetized pin 14.

The resulting, concentrated conductive loading region 18 in the conductive loaded resin-based material 12 increases the electrical and mechanical contact between the pin 14 and the network of conductive fibers and/or powder in the conductive loaded resin-based material. Therefore, the resistance between the pin 14 and the bulk conductive loaded resin-based material 12 is kept to a minimum.

As another preferred embodiment, a metal layer 16 is plated onto the metal pin 14. The metal plating 16 preferably comprises a high conductivity material and, more preferably, comprises a solderable material. This metal plating 16 further reduces the pin 14 to conductive loaded resin-based material 12 resistance. In addition, the metal plating 16 reduces the contact resistance of the pin 14 when inserted into a terminal, not shown, and provides a solderable interface for a solder connection to a circuit or wire.

Figure 7:
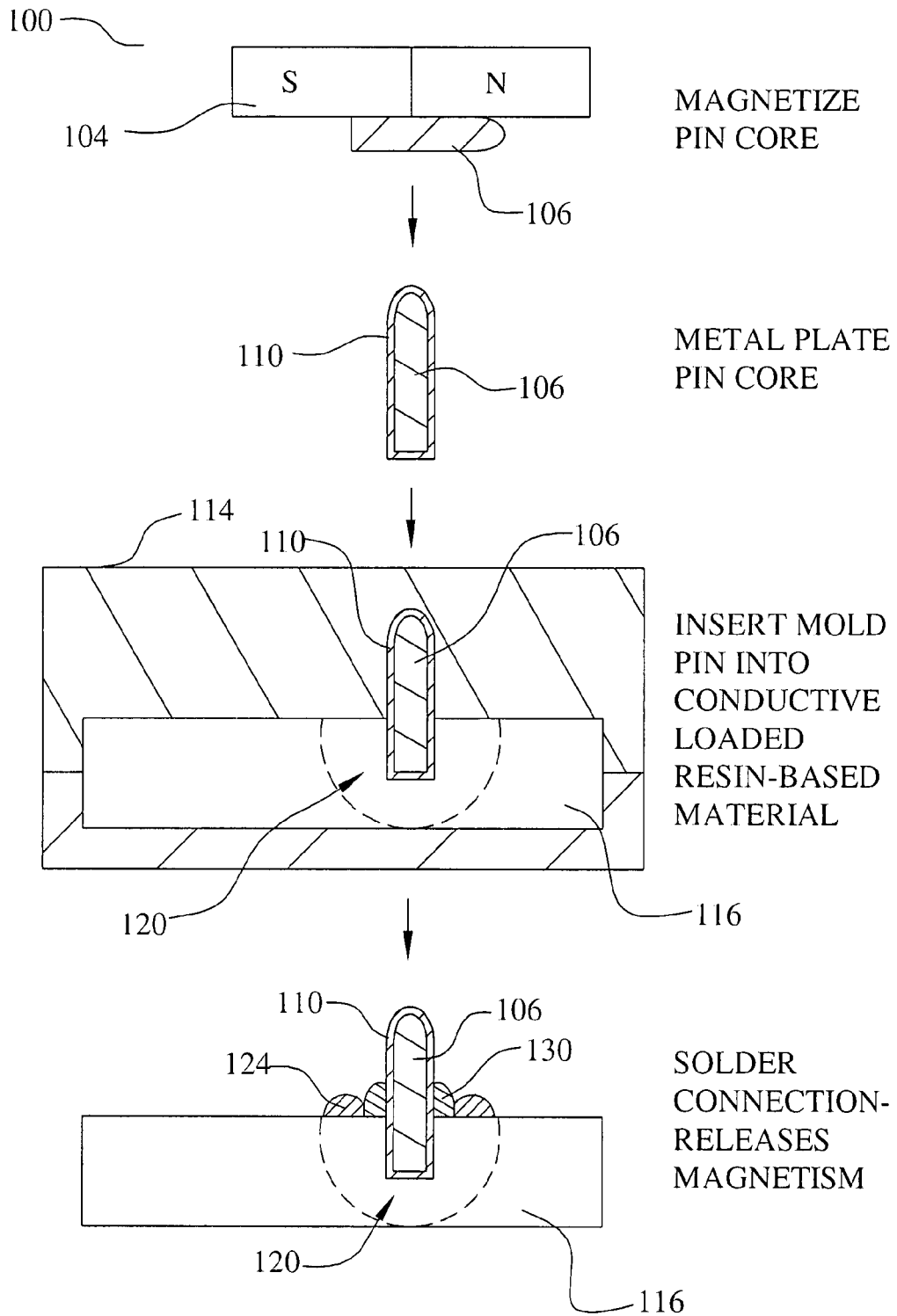
FIG. 7 illustrates a second preferred embodiment of the present invention showing a method to form an electrical interface to a conductive loaded resin-based material.

Referring now to FIG. 7, a second preferred embodiment 100 of the present invention is shown. More particularly, one embodiment 100 of a method to form the electrical interface of FIG. 1 is illustrated. Referring again to FIG. 1, an interface pin 106 of a magnetizing metal is provided. For example, the interface pin 106 comprises iron according to one embodiment. The metal pin 106 is magnetized. According to one embodiment, the pin 106 is placed into contact with a strong magnet 104 to magnetize the pin 106. The pin core 106 is then plated with a solderable metal layer 110 according to another embodiment. Alternatively, the pin 106 may be non-plated. According to yet another alternative, the metal plating is performed prior to the magnetizing step. According to yet another embodiment, the pin 106 is not plated. In another embodiment, the pin 106 is a plurality of pins, terminals, sockets, or the like.

The magnetized pin 106 and 110 is next placed into a holding fixture of a molding apparatus 114. Molten conductive loaded resin-based material 116 is then injected into the mold 114 such that the pin 106 and 110 is insert molded into the conductive loaded resin-based material device 116. The magnetization of the pin core 106 causes the high concentration fiber and/or powder area 120 to be formed in the conductive loaded resin-based material device 116. This area 120 enhances the electrical connectivity between the pin 106 and 110 and the conductive matrix. The molded device 116 is next removed from the mold apparatus 114. The pin 106 and 110 is now permanently embedded into the conductive loaded resin-based material device 116. Finally, the magnetism of the pin core 106 is removed by a high temperature operation such as a soldering process. In the preferred embodiment a solder material 130 is bonded to the pin 106 and 110 to mechanically and electrically connect the pin 106 and 110 to a circuit. In the illustration, a metal connector tab 124 is bonded to the pin 106 and 110 via a solder connection 130. The high concentration area 120 in the conductive matrix remains.

Figure 8:
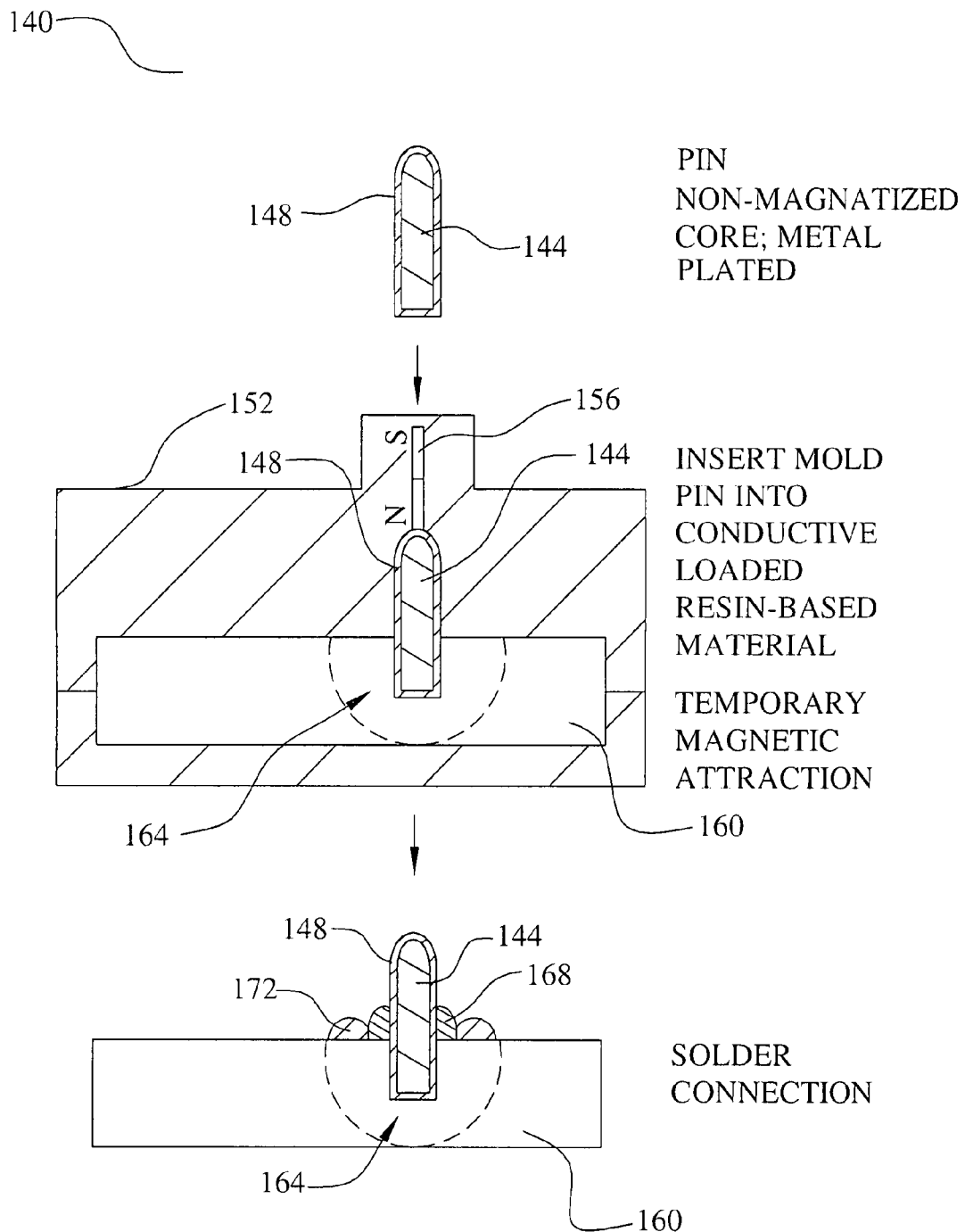
FIG. 8 illustrates a third preferred embodiment of the present invention showing a method to form an electrical interface to a conductive loaded resin-based material.

Referring now to FIG. 8, a third preferred embodiment 140 of the present invention is shown. More particularly, another embodiment 140 of a method to form the electrical interface of FIG. 1 is illustrated. Once again an interface pin with a magnetizable core 144 is provided. The interface pin core 144 comprises iron according to one embodiment. The pin core 144 is plated with a solderable metal layer 148 according to another embodiment. Alternatively, the pin 144 may be non-plated. In another embodiment, the pin 144 is a plurality of pins, terminals, sockets, or the like. The pin 144 and 148 is next placed into a holding fixture of a molding apparatus 152. While in the mold apparatus 152, the pin 144 and 148 is placed into contact with a magnet 156. In this embodiment a small, weak magnet may be used to provide a temporary magnet field through the pin 144 and 148.

Molten conductive loaded resin-based material 160 is then injected into the mold 152 such that the pin 144 and 148 is insert molded into the conductive loaded resin-based material device 152. The magnetization of the pin core 144 causes the high concentration fiber and/or powder area 164 to be formed in the conductive loaded resin-based material device 160. This area 164 enhances the electrical connectivity between the pin 144 and 148 and the conductive matrix. The molded device 160 is next removed from the mold apparatus 152. The pin 144 and 148 is now permanently embedded into the conductive loaded resin-based material device 160. In this case, the pin core 144 merely transmitted magnetic field while in the mold apparatus 152 and in contact with the permanent magnet 156. Once the completed device 160 is removed from the mold apparatus, the pin 144 and 148 exhibits no residual magnetism. In the preferred embodiment a solder material 168 is bonded to the pin 144 and 148 to mechanically and electrically connect the pin 144 and 148 to a circuit. In the illustration, a metal connector tab 172 is bonded to the pin 144 and 148 via a solder connection 168. The high concentration area 164 in the conductive matrix remains.

Figure 10:
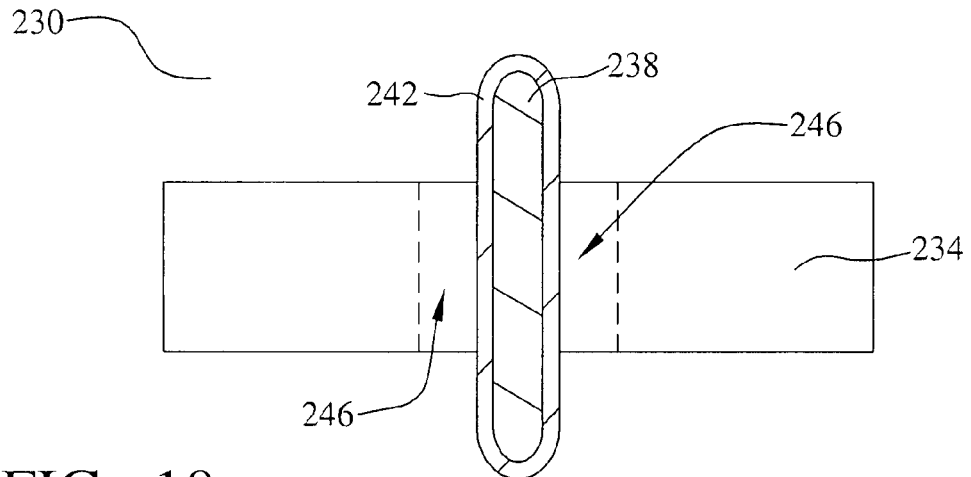
FIG. 10 illustrates a fifth preferred embodiment of the present invention showing an electrical interface to a conductive loaded resin-based material.
Figure 11A:
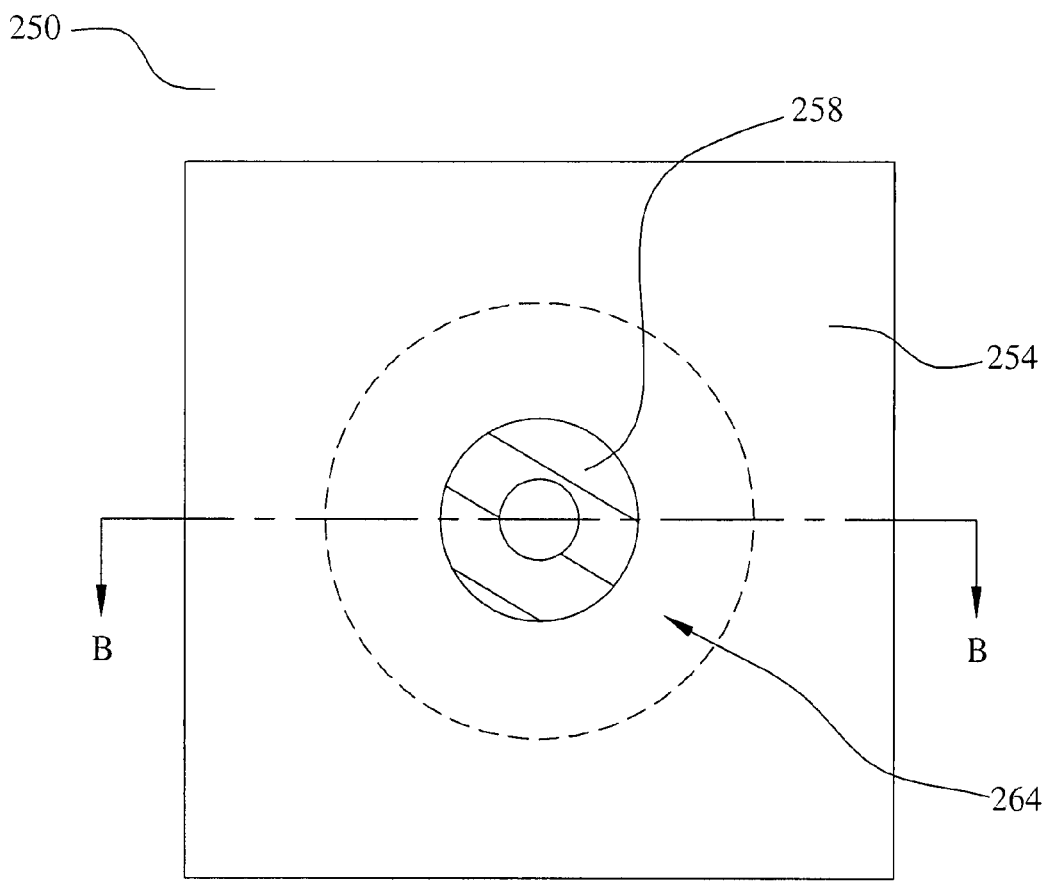
FIGS. 11a and 11b illustrate a sixth preferred embodiment of the present invention showing an electrical interface to a conductive loaded resin-based material.
Figure 11B:
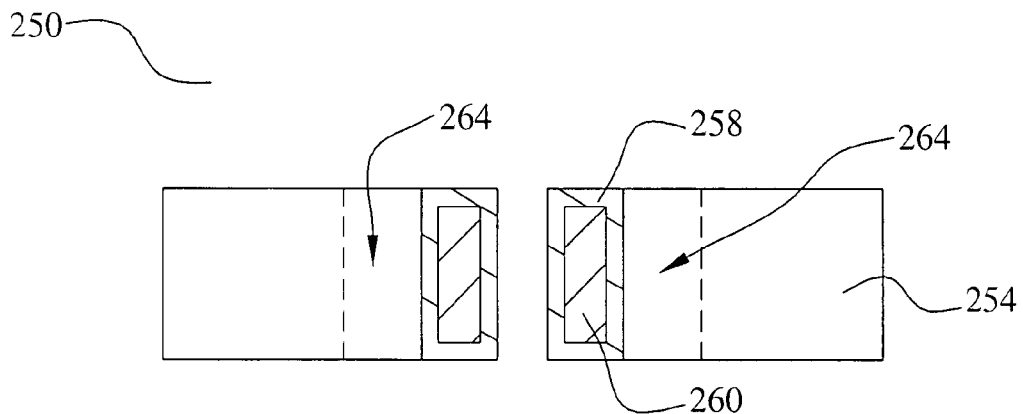

Many other embodiments of the embedded terminal, or pin, concept are envisioned within the scope of the invention. Referring now to FIGS. 10, 11a, and 11b, additional embodiments are illustrated. Referring particularly to FIG. 10, the pin 138 and 242, again shown as a magnetizable metal core 238 and a solderable metal plating 242 is insert molded into the conductive loaded resin-based material 234 such that the pin 238 and 242 extends through the molded conductive loaded resin-based device 234 with the concentration area 246 there surrounding. This embodiment 230 may be formed using either of the methods of FIGS. 7 and 8. Referring particularly to FIGS. 11a and 11b, a through hole terminal 260 and 258 with magnetizable core metal 260 and solderable metal plating 258 is insert molded into the conductive loaded resin-based material device 254 such that the pin 260 and 258 extends through the device 254 with the concentration area 264 there surrounding.

Figure 9:
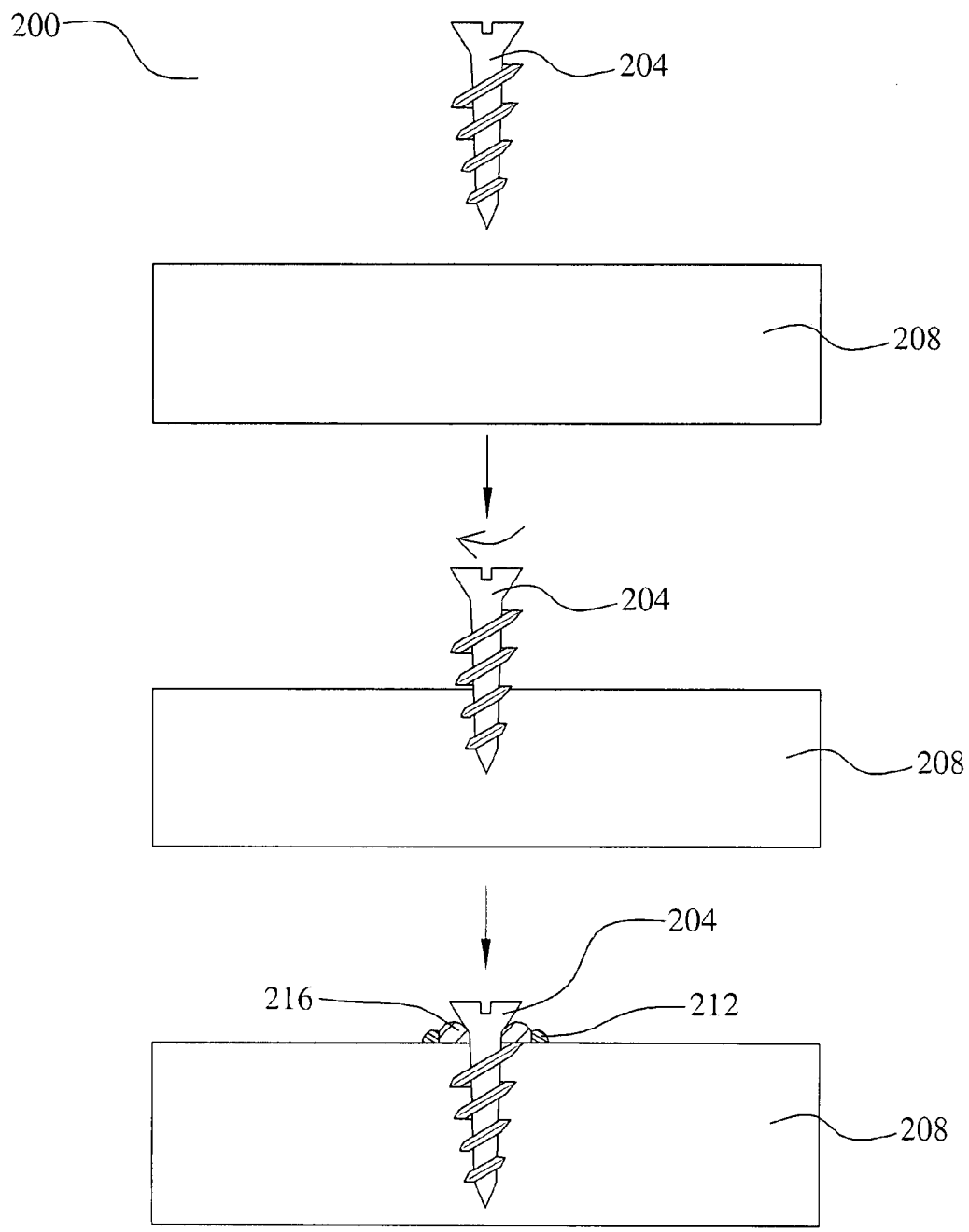
FIG. 9 illustrates a fourth preferred embodiment of the present invention showing a method to form an electrical interface to a conductive loaded resin-based material.

Referring now to FIG. 9, a fourth preferred embodiment 200 of the present invention is illustrated. In this embodiment, a conductive terminal 204 is embedded into the conductive loaded resin-based material device 208 after the device 208 has been molded. According to the illustrated embodiment, the conductive terminal 204 comprises a metal screw 204 that is driven into the conductive loaded resin-based material device 208 such that the shaft of the screw 204 intersects the conductive matrix. Alternatively, the conductive terminal 204 comprises a pin, nail, staple, or the like, that is mechanically driven into the conductive loaded resin-based device 208. After the conductive terminal 204 is embedded, a connector tab 212 is solder 216 bonded to the terminal 204 according to the illustration. In this case, the conductive terminal 204 comprises, or is plated with, a solderable metal such as copper or brass.

Figure 12:
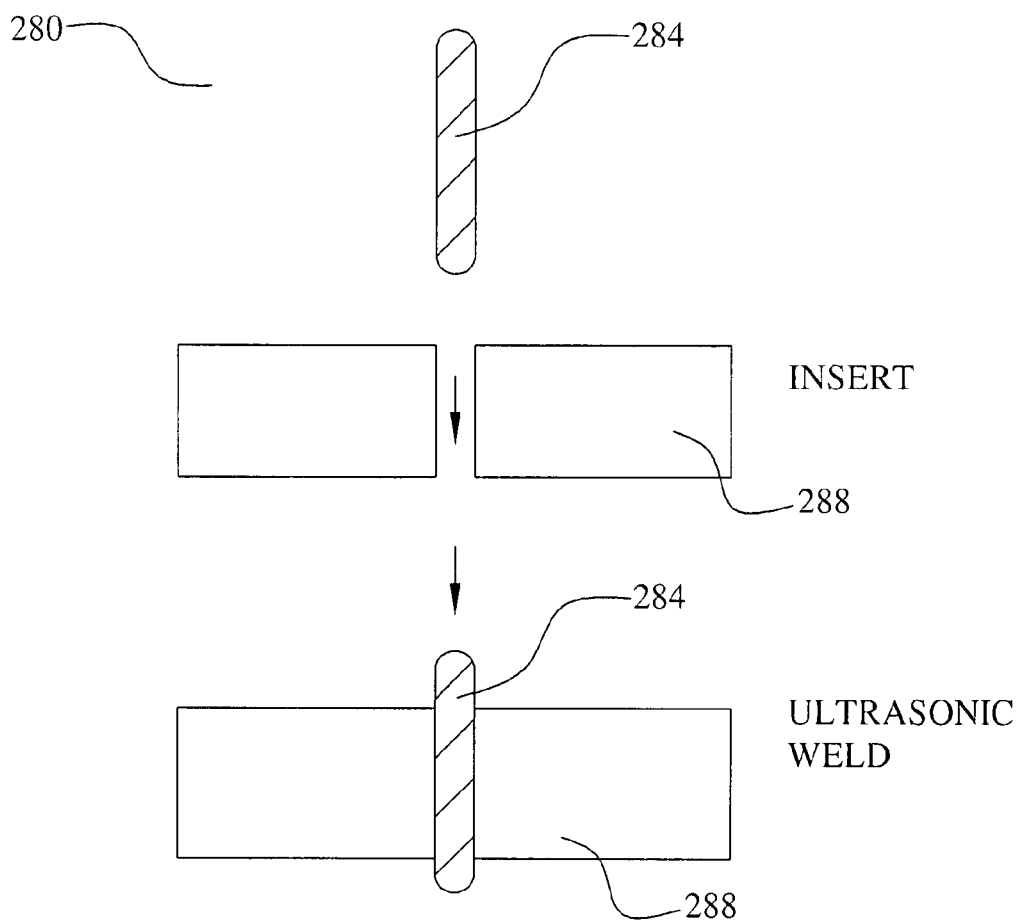
FIG. 12 illustrates a seventh preferred embodiment of the present invention showing a method to form an electrical interface to a conductive loaded resin-based material.

Referring now to FIG. 12, a seventh preferred embodiment 280 of the present invention is illustrated. In this embodiment a pin 284 is inserted into a preformed opening in the molded conductive loaded resin-based device 288. According to one embodiment, the preformed opening is molded into the conductive loaded resin-based device 288. According to another embodiment, the opening is formed after molding by drilling, punching, stamping, or the like. The pin 284 may further comprise a complex terminal, socket, or the like. After the pin 284 is inserted into the opening in the conductive loaded resin-based device 288, an ultrasonic welding operation is used to mechanically bond the pin 284 to the conductive loaded resin-based material 288. The pin 284 makes electrical contact with the conductive matrix where the matrix fiber and/or powder is exposed in the opening. The pin 284 comprises a metal layer. According to one embodiment, the pin 284 is solderable.

Figure 13:
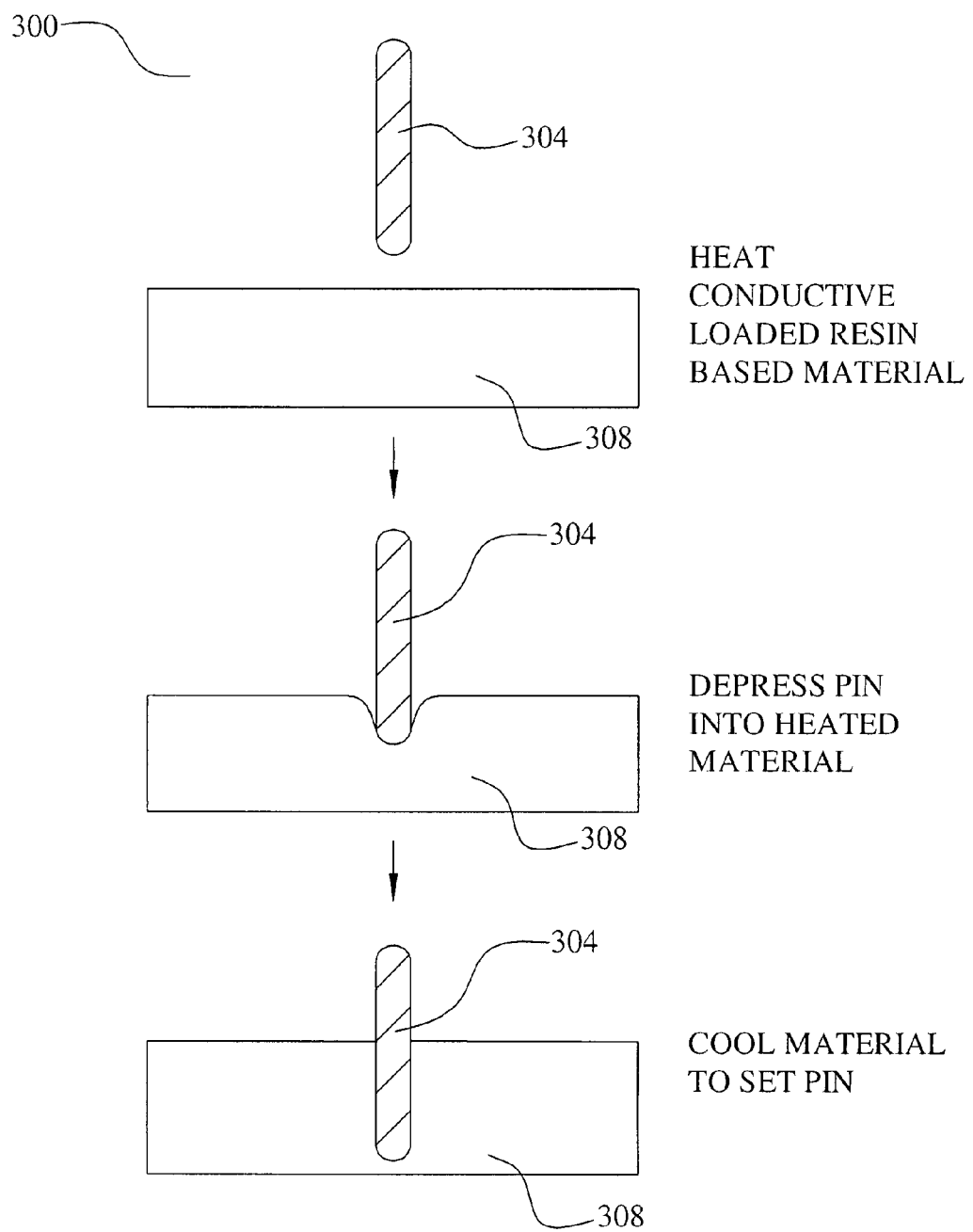
FIG. 13 illustrates an eighth preferred embodiment of the present invention showing a method to form an electrical interface to a conductive loaded resin-based material.

Referring now to FIG. 13, an eighth preferred embodiment 300 of the present invention is illustrated. In this embodiment, a pin 304 is inserted into a previously molded conductive loaded resin-based material device 308 to form an electrical connection to the conductive matrix. The molded conductive loaded resin-based device 308 is heated to a temperature sufficient to make the device 308 plastic but not sufficient to cause melting. The pin 304 is then mechanically depressed into the device 308. Upon cooling of the conductive loaded resin-based device 308, the pin 304 is mechanically set in the material 308. The pin 304 comprises a conductive material and, more preferably, comprises metal. The pin 304 may comprises a terminal, socket, or other more complex interconnection device. According to one embodiment, the pin 304 comprises, or is plated with, a solderable layer.

Figure 2:
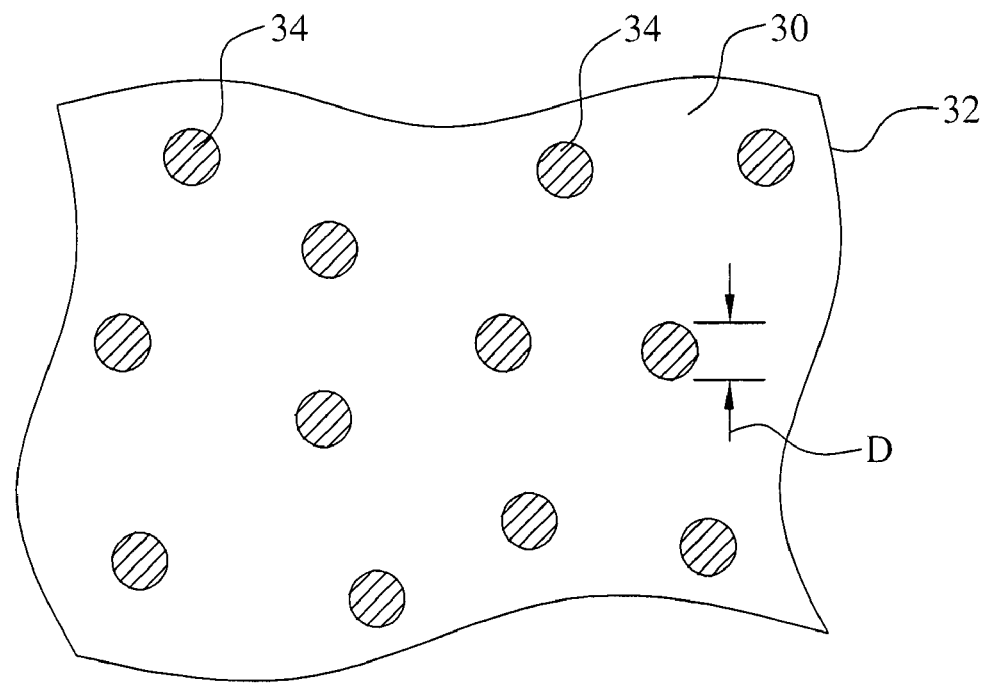
FIG. 2 illustrates a first preferred embodiment of a conductive loaded resin-based material wherein the conductive materials comprise a powder.

The conductive loaded resin-based material of the present invention typically comprises a micron powder(s) of conductor particles and/or in combination of micron fiber(s) homogenized within a base resin host. FIG. 2 shows cross section view of an example of conductor loaded resin-based material 32 having powder of conductor particles 34 in a base resin host 30. In this example the diameter D of the conductor particles 34 in the powder is between about 3 and 12 microns.

Figure 3:
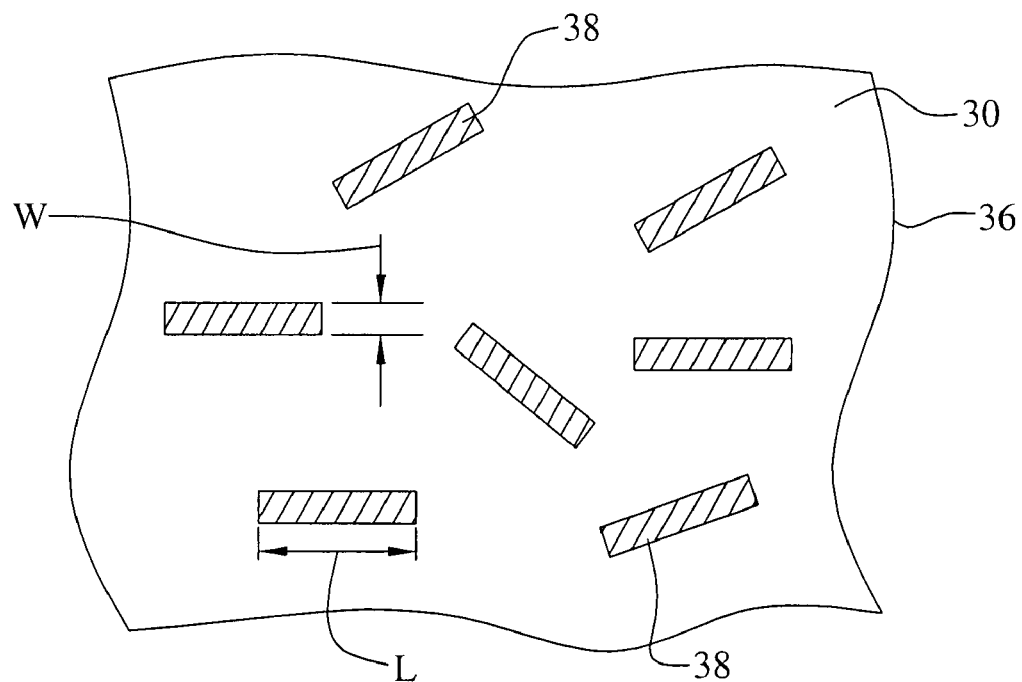
FIG. 3 illustrates a second preferred embodiment of a conductive loaded resin-based material wherein the conductive materials comprise micron conductive fibers.
Figure 4:
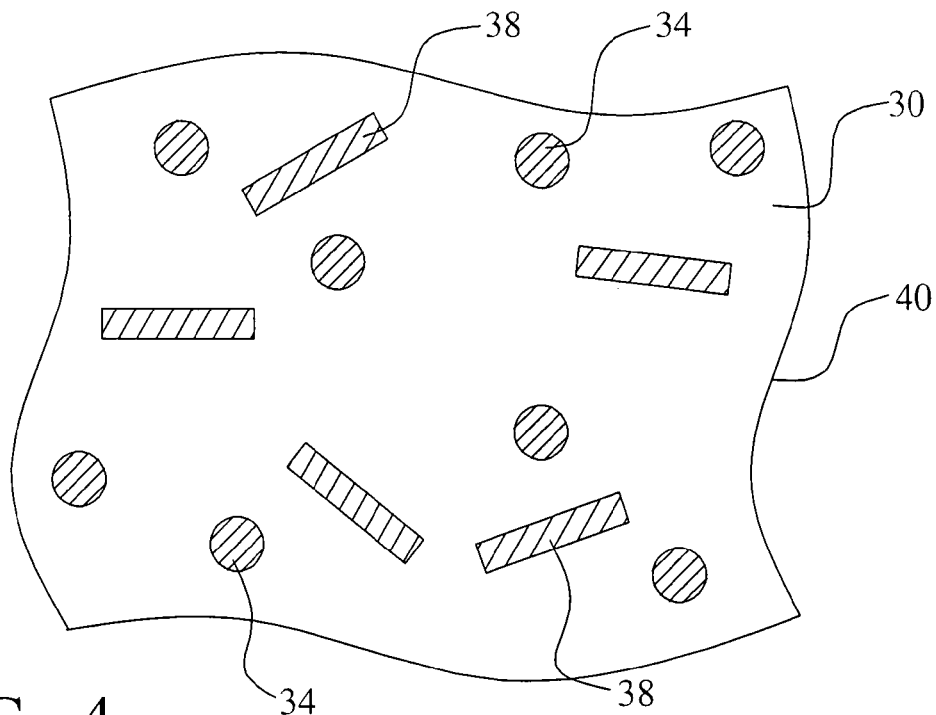
FIG. 4 illustrates a third preferred embodiment of a conductive loaded resin-based material wherein the conductive materials comprise both conductive powder and micron conductive fibers.

FIG. 3 shows a cross section view of an example of conductor loaded resin-based material 36 having conductor fibers 38 in a base resin host 30. The conductor fibers 38 have a diameter of between about 3 and 12 microns, typically in the range of 10 microns or between about 8 and 12 microns, and a length of between about 2 and 14 millimeters. The conductors used for these conductor particles 34 or conductor fibers 38 can be stainless steel, nickel, copper, silver, or other suitable metals or conductive fibers, or combinations thereof. These conductor particles and or fibers are homogenized within a base resin. As previously mentioned, the conductive loaded resin-based materials have a sheet resistance between about 5 and 25 ohms per square, though other values can be achieved by varying the doping parameters and/or resin selection. To realize this sheet resistance the weight of the conductor material comprises between about 20% and about 50% of the total weight of the conductive loaded resin-based material. More preferably, the weight of the conductive material comprises between about 20% and about 40% of the total weight of the conductive loaded resin-based material. More preferably yet, the weight of the conductive material comprises between about 25% and about 35% of the total weight of the conductive loaded resin-based material. Still more preferably yet, the weight of the conductive material comprises about 30% of the total weight of the conductive loaded resin-based material. Stainless Steel Fiber of 8-11 micron in diameter and lengths of 4-6 mm and comprising, by weight, about 30% of the total weight of the conductive loaded resin-based material will produce a very highly conductive parameter, efficient within any EMF spectrum. Referring now to FIG. 4, another preferred embodiment of the present invention is illustrated where the conductive materials comprise a combination of both conductive powders 34 and micron conductive fibers 38 homogenized together within the resin base 30 during a molding process.

Figure 5A:
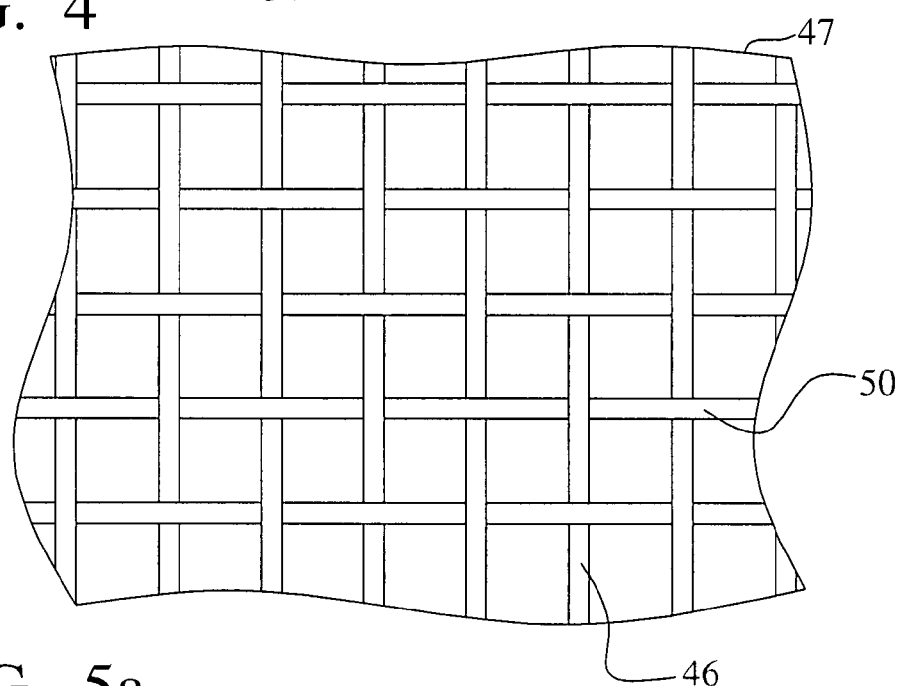
FIGS. 5a and 5b illustrate a fourth preferred embodiment wherein conductive fabric-like materials are formed from the conductive loaded resin-based material.
Figure 5B:
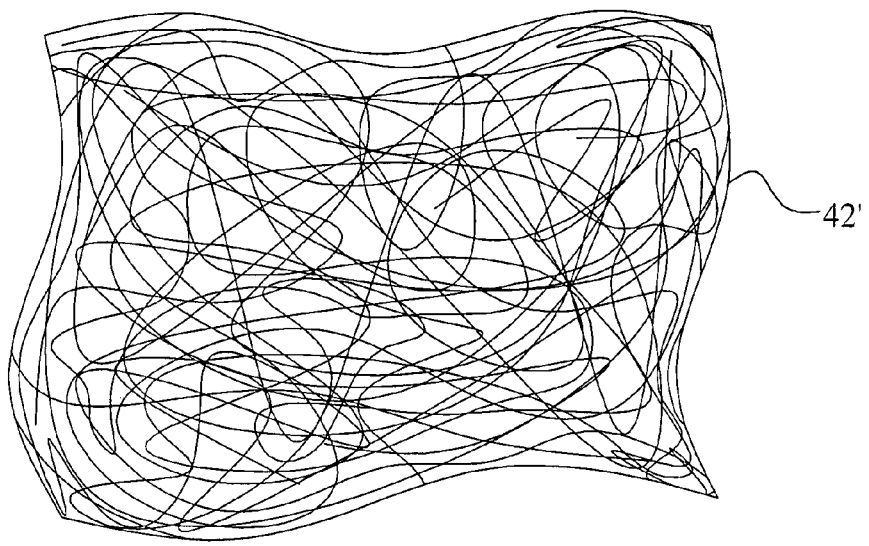

Referring now to FIGS. 5a and 5b, a preferred composition of the conductive loaded, resin-based material is illustrated. The conductive loaded resin-based material can be formed into fibers or textiles that are then woven or webbed into a conductive fabric. The conductive loaded resin-based material is formed in strands that can be woven as shown. FIG. 5a shows a conductive fabric 42 where the fibers are woven together in a two-dimensional weave 46 and 50 of fibers or textiles. FIG. 5b shows a conductive fabric 42' where the fibers are formed in a webbed arrangement. In the webbed arrangement, one or more continuous strands of the conductive fiber are nested in a random fashion. The resulting conductive fabrics or textiles 42, see FIG. 5a, and 42', see FIG. 5b, can be made very thin, thick, rigid, flexible or in solid form(s).

Similarly, a conductive, but cloth-like, material can be formed using woven or webbed micron stainless steel fibers, or other micron conductive fibers. These woven or webbed conductive cloths could also be sandwich laminated to one or more layers of materials such as Polyester(s), Teflon(s), Kevlar(s) or any other desired resin-based material(s). This conductive fabric may then be cut into desired shapes and sizes.

Figures 6A, 6B:
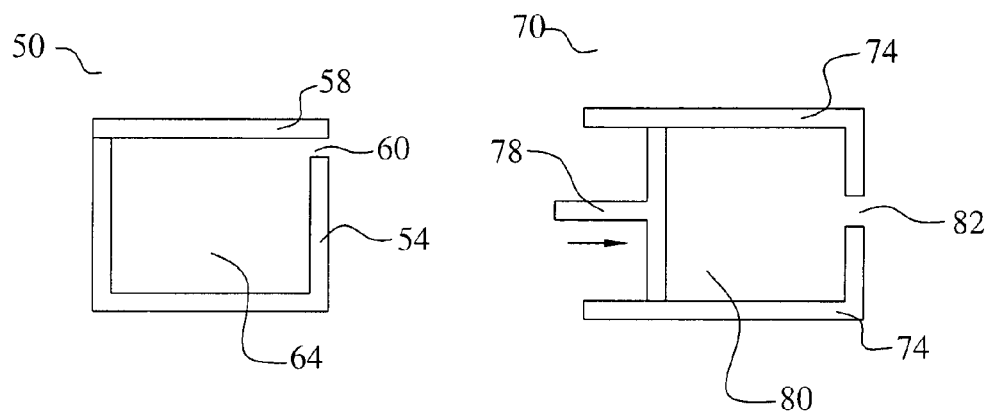
FIGS. 6a and 6b illustrate, in simplified schematic form, an injection molding apparatus and an extrusion molding apparatus that may be used to mold devices of conductive loaded resin-based material.

Devices formed from conductive loaded resin-based materials can be formed or molded in a number of different ways including injection molding, extrusion or chemically induced molding or forming. FIG. 6a shows a simplified schematic diagram of an injection mold showing a lower portion 54 and upper portion 58 of the mold 50. Conductive loaded blended resin-based material is injected into the mold cavity 64 through an injection opening 60 and then the homogenized conductive material cures by thermal reaction. The upper portion 58 and lower portion 54 of the mold are then separated or parted and the devices are removed.

FIG. 6b shows a simplified schematic diagram of an extruder 70 for forming devices using extrusion. Conductive loaded resin-based material(s) is placed in the hopper 80 of the extrusion unit 74. A piston, screw, press or other means 78 is then used to force the thermally molten or a chemically induced curing conductive loaded resin-based material through an extrusion opening 82 which shapes the thermally molten curing or chemically induced cured conductive loaded resin-based material to the desired shape. The conductive loaded resin-based material is then fully cured by chemical reaction or thermal reaction to a hardened or pliable state and is ready for use. Thermoplastic or thermosetting resin-based materials and associated processes may be used in molding the conductive loaded resin-based articles of the present invention.

The advantages of the present invention may now be summarized. An effective electrical interface to conductive loaded resin-based material is achieved. A method to form an electrical interface to conductive loaded resin-based material is achieved. The characteristics of the electrical interface to the conductive loaded resin-based material can be altered or the visual characteristics can be altered by forming a metal layer over the conductive loaded resin-based material. Methods to fabricate an electrical interface to conductive loaded resin-based material incorporating various forms of the material are achieved.

As shown in the preferred embodiments, the novel methods and devices of the present invention provide an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A method to form a conductive device, said method comprising:
    molding a conductive loaded, resin-based material consisting essential of micron conductive fiber having a diameter of between 3 µm and 12 µm and a length of between 2 mm and 14 mm in a resin-based host;
    providing a metal terminal; and
    forming a hole in said conductive loaded resin-based material;
    inserting said metal terminal into said hole; and
    ultrasonically welding said metal terminal to said conductive loaded resin-based material.

2. The method according to claim 1 wherein said step of forming a hole is performed during said step of molding.

3. The method according to claim 1 wherein said step of forming a hole comprises drilling, stamping, or punching said conductive loaded resin-based material after said step of molding.

4. The method according to claim 1 wherein said step of inserting comprises mechanically driving said metal terminal into said conductive loaded resin-based material.

5. The method according to claim 1 wherein said metal terminal comprises a screw.

6. The method according to claim 1 wherein said micron conductive fiber is metal.

7. The method according to claim 1 wherein said micron conductive fiber is a non-conductive core with metal plating.

8. The method according to claim 1 wherein said step of molding is injection molding.

9. The method according to claim 1 wherein said step of molding is extrusion.

10. The method according to claim 1 wherein said metal terminal is a pin or socket.

* * * * *